United States Patent
Ohara et al.

(10) Patent No.: US 9,752,209 B2
(45) Date of Patent: *Sep. 5, 2017

(54) METHOD FOR PRODUCING HEMATITE FOR IRONMAKING

(71) Applicant: SUMITOMO METAL MINING CO., LTD., Tokyo (JP)

(72) Inventors: Go Ohara, Tokyo (JP); Hideki Sasaki, Tokyo (JP); Yasumasa Kan, Tokyo (JP); Masaki Imamura, Tokyo (JP)

(73) Assignee: Sumitomo Metal Mining Co., Ltd., Minato-ku, Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 14/784,336

(22) PCT Filed: Apr. 14, 2014

(86) PCT No.: PCT/JP2014/060612
§ 371 (c)(1),
(2) Date: Oct. 14, 2015

(87) PCT Pub. No.: WO2014/175094
PCT Pub. Date: Oct. 30, 2014

(65) Prior Publication Data
US 2016/0115565 A1    Apr. 28, 2016

(30) Foreign Application Priority Data
Apr. 24, 2013   (JP) .................................. 2013-091814

(51) Int. Cl.
*B03C 1/30* (2006.01)
*C22B 3/22* (2006.01)
(Continued)

(52) U.S. Cl.
CPC .................. *C22B 3/22* (2013.01); *B03B 5/34* (2013.01); *B03B 7/00* (2013.01); *B03C 1/025* (2013.01);
(Continued)

(58) Field of Classification Search
CPC .... B03B 5/34; B03B 7/00; B03C 1/30; B03C 2201/18; B03C 2201/20; C22B 3/22
(Continued)

(56) References Cited

U.S. PATENT DOCUMENTS

| | | | |
|---|---|---|---|
| 5,316,746 A * | 5/1994 | Narita | C01G 49/0036 423/138 |
| 7,964,165 B2 * | 6/2011 | Nakai | C01G 9/08 423/101 |

(Continued)

FOREIGN PATENT DOCUMENTS

| | | |
|---|---|---|
| CA | 2 678 724 | 3/2010 |
| JP | 62-254851 | 11/1987 |

(Continued)

*Primary Examiner* — Joseph C Rodriguez
(74) *Attorney, Agent, or Firm* — Gerald E. Hespos; Michael J. Porco; Matthew T. Hespos

(57) ABSTRACT

A method is provided for separating a leach residue from which a hematite-containing material capable of being used as a raw material for ironmaking can be obtained. A method also is provided for producing hematite for ironmaking from the leach residue. The method utilizes a leach residue as a raw material, the leach residue being obtained from a hydrometallurgical refining plant where a nickel oxide ore treated by a high pressure acid leach process. The method includes, in sequence: a separation step of separating the leach residue into an overflow and an underflow with a wet cyclone; and another separation step of separating the separated overflow into a strong magnetic substance and a weak magnetic substance using magnetic force, wherein a strong- (Continued)

magnetic-field magnetic separator is used in the another separation step using the magnetic force.

6 Claims, 2 Drawing Sheets

(51) Int. Cl.
*C01G 49/06* (2006.01)
*B03C 1/025* (2006.01)
*B03B 5/34* (2006.01)
*B03B 7/00* (2006.01)
*C22B 7/00* (2006.01)

(52) U.S. Cl.
CPC ................ *B03C 1/30* (2013.01); *C01G 49/06* (2013.01); *C22B 7/005* (2013.01); *B03C 2201/20* (2013.01); *Y02P 10/234* (2015.11)

(58) Field of Classification Search
USPC .......................................... 209/39, 215, 725
See application file for complete search history.

(56) References Cited

U.S. PATENT DOCUMENTS

| 8,708,152 | B2* | 4/2014 | Lehtinen | B03C 1/03 209/223.1 |
| 2015/0284820 | A1* | 10/2015 | Hattori | C22B 23/0415 423/150.1 |
| 2016/0024614 | A1* | 1/2016 | Matsubara | C22B 23/0407 75/743 |
| 2016/0076121 | A1* | 3/2016 | Ohara | C22B 34/32 75/743 |
| 2016/0152487 | A1* | 6/2016 | Ohara | B03C 1/002 423/138 |
| 2016/0340201 | A1* | 11/2016 | Ohara | C22B 23/0453 |
| 2016/0362304 | A1* | 12/2016 | Ohara | C22B 1/16 |

FOREIGN PATENT DOCUMENTS

| JP | 2010-95788 | 4/2010 |
| WO | 2007/099714 | 9/2007 |

* cited by examiner

METHOD FOR PRODUCING HEMATITE FOR IRONMAKING

BACKGROUND

1. Field of the Invention

The present invention relates to a method for producing hematite for ironmaking.

2. Description of the Related Art

More particularly, the present invention relates to a technique for separating a tailings slurry obtained after a nickel oxide ore is treated though a final neutralization step according to a high pressure acid leach (HPAL) process in a hydrometallurgical refining plant, thereby recovering hematite for ironmaking.

Nickel has been widely used as a raw material of stainless steel, but in accordance with the tendency of depletion of a sulfide ore that becomes a raw material of nickel, a technology of refining a low-grade oxide ore has been developed and has been into practical use.

Specifically, a producing process called a "high pressure acid leach (HPAL)" process has been put into practical use, in which process a nickel oxide ore such as limonite and saprolite is put into a pressurizing apparatus such as an autoclave in combination with a sulfuric acid solution, and nickel is leached under a high temperature of approximately 240° C. to 300° C. and a high pressure. FIG. 3 illustrates a schematic flowchart of the producing process.

A neutralizing agent is added to nickel that is leached in the sulfuric acid solution by the HPAL process to neutralize a surplus acid, and then nickel is subjected to solid-liquid separation treatment to be separated from a leach residue.

Then, the nickel is recovered as an intermediate raw material in a form of hydroxide or sulfide through a process of separating impurities, and the intermediate raw material is further refined to obtain nickel as nickel metal, a nickel salt compound, and the like.

In the neutralization process of neutralizing the surplus acid, pH of the leach substance is adjusted to be appropriate for the solid-liquid separation, and then in a subsequent process or the solid-liquid separation process concentration of a solid content and solid-liquid separation are performed in a facility called counter current decantation (CCD). Typically, in CCD, a plurality of continuous stages of thickeners are used.

A liquid component (hereinafter, may be referred to as an overflow), which is obtained from the CCD, is returned to a neutralization process for adjustment of pH that is appropriate for a sulfurization process. In the neutralization process, a pH adjustment is performed to remove a fine solid content that occurs, through precipitation. Then, for example, the liquid component is subjected to a sulfurization treatment, whereby an intermediate raw material such as a nickel sulfide is obtained.

Employing the HPAL process makes it possible to leach nickel almost completely, for example, in the case of nickel oxide ore, even in a low grade ore in which a target valuable metal to be recovered is contained in an amount of 1% by weight to 2% by weight (hereinafter, the weight will be expressed by "%"). Accordingly, a target metal is concentrated to the same extent as in a conventional raw material, and the target metal can be obtained through substantially the same refining method and refining process as in the conventional raw material. In addition, the HPAL process is applicable to not only the nickel oxide ore but also different raw materials, such as a nickel sulfide ore, a copper sulfide ore, and a copper oxide ore.

Besides, a main component of the leach residue that is obtained by the HPAL process is an iron oxide, and approximately 40 to 50% of iron is contained in the solid content of the leach residue. In addition, Production amount of the leach residue is approximately 50 times to 100 times as much as that of the intermediate raw material. The reason for this is that each of the nickel oxide ore or the sulfide ore that is a raw material contains iron in an amount much more than that of nickel.

The leach residue is generated at a high temperature, and is in a type of a chemically and environmentally stable oxide, but has no particular utility value in a current state, and has been thus scrapped and stored in a residue disposal yard.

Therefore, a broad residue disposal yard is necessary for scrap and storage of an enormous amount of the leach reside which is generated in accordance with the HPAL process operation.

By the way, many of the iron oxide is contained in an iron ore and the iron ore has been widely used as a raw material for refined steel.

In steel smelting, target steel is produced by charging iron ore containing iron oxide into a blast furnace along with a reductant such as coke, heating and melting the iron ore under a reducing atmosphere to obtain crude steel, and then refining the crude steel in a converter.

Typically, the iron ore as the raw material is a limited resource, and availability of an iron ore with high quality that is necessary for quality maintenance of steel becomes gradually difficult. Accordingly, a study has been made with respect to use of the leach residue as the iron ore.

However, the leach residue in the HPAL process cannot be directly used for a raw material for ironmaking for the following reasons.

The leach residue in the HPAL process contains vein stone or impurities, particularly sulfur, in addition to the iron oxide, and thus the leach residue is not appropriate for a raw material that is used in a conventional ironmaking process in common. Specifically, this is because the sulfur content is high.

Particularly, the sulfur content in the iron oxide which can be used for a raw material for ironmaking is different depending on facility capacity, an amount of production, and the like in individual ironworks. However, typically, it is necessary to suppress the sulfur content to less than 1%.

On the other hand, the solid-content leach residue contains approximately 5% to 8% of sulfur. The majority of sulfur in the leach residue is derived from calcium sulfate (gypsum) that is mixed in during the HPAL process.

When neutralizing free sulfuric acid (the free sulfuric acid is sulfuric acid that remains without reaction in the sulfuric acid that is excessively added for performing sufficient leaching in the HPAL process), which remains in leach slurry that is obtained during high-pressure acid leaching, a typical inexpensive calcium-based neutralizing agent, for example, limestone or slaked lime is added. Accordingly, when calcium contained in the neutralizing agent and the free sulfuric acid react with each other, the gypsum is generated and is then mixed into the leach residue.

A part (approximately 1%) of sulfur that is contained in the solid-content leach residue is trapped inside particles of hematite that is generated.

The solid content in the residue after nickel leach obtained at this point is mainly constituted by hematite of approximately 1 μm, and the solid content contains the iron grade of approximately 30 to 40% and the sulfur grade of approximately 5 to 8%. The moisture content of the leach residue obtained at this point is 60%.

In order to use the leach residue as hematite for ironmaking, it is necessary to achieve the iron grade of 50% or more and the sulfur grade of 1% or less in the solid-content leach residue.

To achieve this, for example, JP 2010-095788 A discloses a technique for removing impurities contained in a mixture of hematite by separating a leach residue by sieve classification, wet-cyclone separation, and magnetic separation, and the technique has been recognized to have some effect on removal of impurities contained in hematite.

However, the method is not enough to use the leach residue after the physical separation alone as hematite for ironmaking as described above, and in particular, the iron content only increases to approximately 40 to 45% at most. Accordingly, in order to use such a leach residue as hematite for ironmaking, it was necessary to mix with a raw material for ironmaking which contains a higher grade of iron. The moisture content of the leach residue obtained by physical separation is approximately 40%.

The present invention has been made in consideration of these problems to propose a technique for separating a leach residue from which a hematite-containing material capable of being used as a raw material for ironmaking can be obtained and to provide a method for producing hematite for ironmaking from the leach residue.

SUMMARY

The present inventors have found a method capable of solving the above problems of the iron content and the sulfur content at the same time by sequentially performing a wet-cyclone separation step and a proper magnetic separation step, and thus the present invention has been achieved.

According to a first aspect of the present invention, there is provided a method for producing hematite for ironmaking, that utilizes a leach residue as a raw material, the leach residue being obtained from a hydrometallurgical refining plant where a nickel oxide ore treated by a high pressure acid leach process. The method comprises at least two steps in sequence: a separation step of separating the leach residue into an overflow and an underflow with a wet cyclone; and an another separation step of separating the separated overflow into a strong magnetic substance and a weak magnetic substance using magnetic force, to produce a hematite cake, wherein a strong-magnetic-field magnetic separator is used in the another separation step using the magnetic force.

According to a second aspect of the present invention, in the separation step using the wet cyclone according to the first aspect, the wet cyclone is adjusted to have a size setting between 1 µm or less and 2 µm or less as a classification particle size for the overflow; and in the another separation step using the magnetic force, a magnetic field intensity is 5 to 20 [kGauss].

According to third aspect of the present invention, the method further includes a dehydration process of adjusting a content of moisture contained in the hematite cake in the first and second aspects to be 10 wt % to 17 wt %.

According to the method for producing hematite for ironmaking of the present invention, it is possible to easily obtain a hematite-containing material with a high quality capable of being used as a raw material for ironmaking from a refining process for an oxide ore and to achieve remarkably industrial effects.

DETAILED DESCRIPTION

A method for producing hematite for ironmaking according to the present invention will be described in detail below with reference to the drawings.

Figure 1:
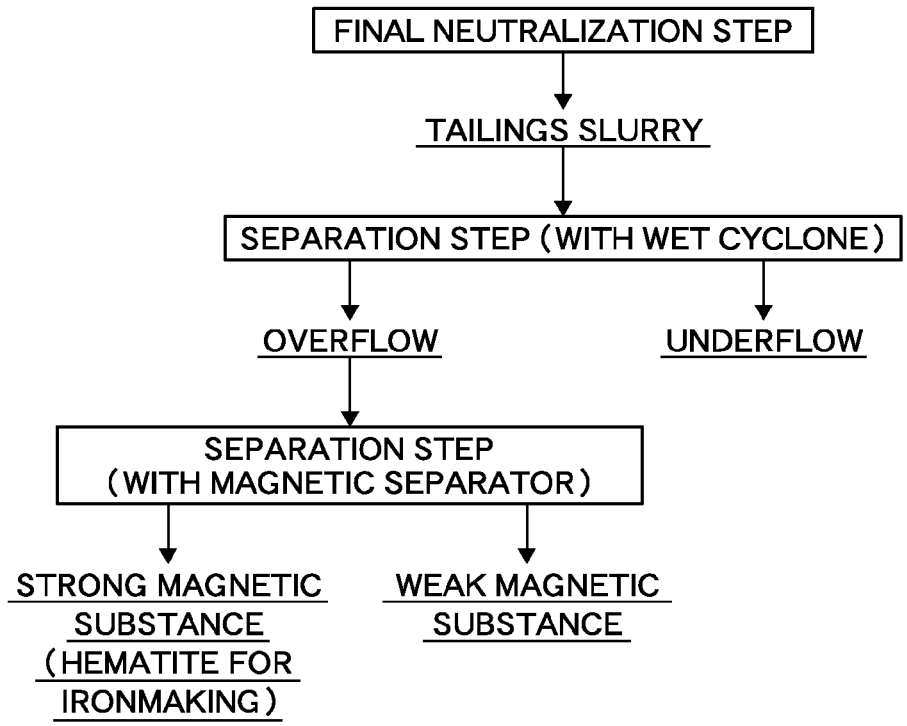
FIG. 1 is a flowchart of a producing process of hematite for ironmaking from a tailings slurry according to the present invention.

FIG. 1 is a flowchart of a producing process of hematite for ironmaking according to the present invention.

Figure 3:
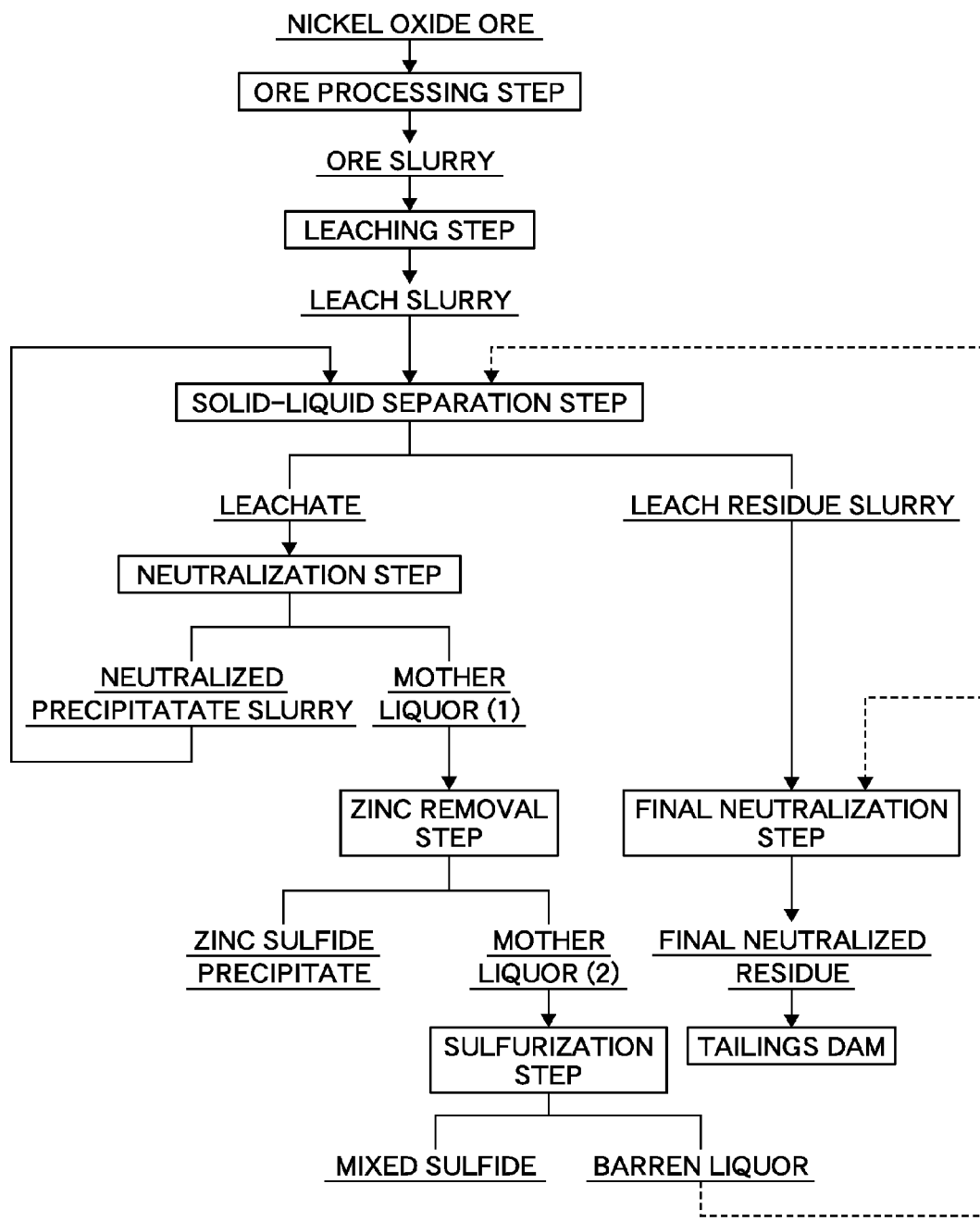
FIG. 3 is a schematic flowchart of a producing process according to an HPAL process.

The present invention is to separate a material having a useful component composition from a leach residue (hereinafter, referred to as "a final neutralized residue (a tailings slurry) stored in a "tailings dam" as illustrated in FIG. 3) that is discharged from a hydrometallurgical refining plant where a nickel oxide ore is subjected to a high pressure acid leach (HPAL) process, as illustrated in the schematic flowchart of a producing process of the HPAL of FIG. 3. The process is characterized by performing, in order, at least two steps: a step of separating a tailings slurry, which is the leach residue, into an overflow and an underflow using a wet cyclone; and a step of separating the separated overflow into a strong magnetic substance (hematite for ironmaking) and a weak magnetic substance using magnetic force, wherein a strong-magnetic-field magnetic separator is used in the step of separating using magnetic force.

Therefore it is possible to obtain hematite for ironmaking with a high iron grade and a low sulfur grade, which has the iron grade of approximately 53% by weight and the sulfur (S) grade of approximately 1% by weight, from the leach residue containing, for example, iron of 30 to 35% and sulfur (S) of 3 to 10%.

Such hematite having the content of these compositions can be provided for ironmaking by itself, and is easily used with a great adjustment margin even when being used by mixing with other raw materials for iron material.

In solid contents of the leach residue in the HPAL process, the iron and sulfur (S) are contained in the form of hematite and gypsum, respectively.

The particle size of the hematite is, for example, approximately 1 µm and the particle size of the gypsum is approximately 30 µm; and the hematite has weak magnetism and the others have no magnetism.

In the present invention, this leach residue is charged into a wet cyclone and the gypsum having the large particle size is mostly removed as an underflow. The hematite having the small particle size is concentrated in the overflow.

Then, the resultant overflow is subjected to a separation treatment using a "strong-magnetic-field magnetic separator" which is magnetizable enough to separate the hematite and chromite from each other.

Magnetic force to be used in typical magnetic separation is approximately 2000 [Gauss] at most. However, for example, for a "strong-magnetic-field magnetic separator" used in Examples, very strong magnetic force can be applied thereto since a method is employed in which magnetic force is applied when powders pass through a mesh. The mesh is set to have optimum apertures for the powders to be separated.

These configurations makes it possible to separate hematite and chromite, which cannot be substantially separated in the typical magnetic separation. In addition, the small amount of remaining gypsum has no magnetism and it can be thus separated from the hematite.

As a result, ultimately, hematite for ironmaking is recovered which contains iron of approximately 53% by weight and sulfur (S) of approximately 1% by weight as discharge substances (magnetized substances) on a magnetic body side of a magnetic separator.

As described above, the method for producing the hematite for ironmaking according to the present invention has a greatest feature to be separated by the wet cyclone at first and to be subsequently separated by the strong-magnetic-field magnetic separator. In this method, however, when the step of the separation by the wet cyclone and the step of the separation by the strong-magnetic-field magnetic separator are merely simply combined with each other, for example, when the steps are performed in a reverse order to the above order, it is difficult to effectively recover the hematite for ironmaking.

More particularly, this is because that when the step of the separation by the strong-magnetic-field magnetic separator is performed at first, it is difficult to apply the magnetic force enough to separate hematite and chromite having a small particle size because of the presence of gypsum having very different particle sizes. In addition, the separation becomes difficult depending on a method for applying the magnetic force of the strong-magnetic-field magnetic separator used. For example, in the "strong-magnetic-field magnetic separator" which is also used in Examples employing a method for applying the magnetic force when the powders pass through the mesh, the gypsum having a large particle size clogs the mesh immediately after operation and thus the separation treatment does not proceed.

The method for producing hematite for ironmaking according to the present invention is characterized in that the first separation is performed by the wet cyclone in such a manner that a classification particle size is set to be in an appropriate range.

The second separation is then performed using the magnetic force of which the magnetic field intensity is set to be an appropriate range.

In this regard, as a setting of a classification particle size of the wet cyclone, first, the setting for overflow may be appropriately adjusted according to the particle size of hematite and gypsum that are contained therein, but the wet cyclone is preferably adjusted so that the classification particle size for overflow is set to be in a range from a setting of 1 µm or less to a setting of 2 µm or less.

In particular, since hematite and gypsum contained in the solid content of a leach residue have generally the particle sizes of approximately 1 µm and approximately 30 µm, respectively, the classification effect by the wet cyclone can be improved in the above range, the leach residue being obtained in such a manner that the nickel oxide ore is subjected to a wet-refining treatment according to the HPAL process and then is treated in a final neutralization process.

Moreover, when the separation is performed using the magnetic force, the magnetic field intensity has preferably a condition of 10 to 15 [kGauss].

Basically, it is preferable that the magnetic field intensity be strong. The reason is that the hematite is insufficiently separated when the magnetic field intensity is less than 5 [kGauss]. In addition, when the magnetic field intensity is larger than 20 [kGauss], further effects are not expected and it is also not preferable in terms of economy.

As for a hematite cake that is obtained through typical dehydration of the leach residue (having a moisture content of approximately 40%) obtained after a physical separation in the producing method of the present invention, the sulfur content thereof is as low as less than 1%, but the moisture content is as relatively high as 22 wt %.

Typically, it is said that for transportation of a solid material, if the moisture content is high, a liquefaction phenomenon occurs during transportation by ship, and thus there is a possibility that the ship is overturned. From an investigation made by Japan Marine Surveyors and Sworn Measurers' Association (NIPPON KAIJI KENTEI KYO-KAI), a transportable moisture limit (TML) of hematite of the present invention is 17 wt % or less. Accordingly, in the case of the transportation by ship, it is necessary to decrease the moisture content of the cake in the case of producing the hematite cake according to the invention.

In addition, a particle size of hematite is as very small as approximately 1 µm, and thus a possibility of dust generation is extremely high. As the moisture content increases, the dust generation further decreases. As the moisture content decreases from 17 wt %, and reaches approximately 10 wt %, fine particles tend to significantly increase, and thus the moisture content is preferably 10% to 17 wt %. In a case where dust prevention is possible by using a flexible container and the like during handling, it is preferable that the moisture content be further lower.

Thus, a process of adjusting the moisture content is performed preferably. In the present invention, dehydration process of removing the moisture content from the hematite cake is performed.

Examples of a dehydration method include a heating method, a filter pressing method, and a centrifugal separation method. The filter pressing method is preferred in consideration of high moisture-removing efficiency and economic efficiency.

Further, it is preferable to granulate the hematite for ironmaking, which is produced by the above-described producing method, to form a granulated material.

In the hematite cake that is obtained in the producing method of the present invention, the following problems and the like may occur. Specifically, the shape of the hematite cake may be not uniform; dusting may occur; and flowability may deteriorate. Accordingly, the problems may occur as followings: in a case where the hematite cake is mixed with other iron ores by an ironmaking maker, it enters a non-uniform mixed state; charging efficiency deteriorate due to the poor flowability; and dusting tends to occur. Accordingly, when a granulated material having a uniform particle size is obtained by performing the granulation, the above-described problems are solved.

For granulation, rolling granulation, compression granulation, and extrusion granulation are preferably used as a granulation method, and a granulated material, which is uniform and has good flowability, is obtained. In addition, occurrence of dusting can be further suppressed in comparison to the hematite cake.

Furthermore, in the hematite for ironmaking according to the present invention, the entirety of sulfur derived from gypsum is removed when the present invention is applied and sulfur considered to be derived from a sulfur component trapped into hematite particles in the high-temperature pressure acid leaching process remains around 1%.

Therefore, when applying the known methods described below, in combination, there is a possibility that the hematite can be used as a more satisfactory raw material for ironmaking.

Specifically, when applying a method of removing sulfur that remains in hematite by drying and baking a supply material so as to remove sulfur and crystal hydration water which are contained in the supply material, as described in "JP 2012-5175223 W", and then a method of briquetting an iron raw material in a powder type as disclosed in "JP 2004-269960 A", or a method of pelleting an iron raw material in a powder type as described in "JP 2012-211363 A", in combination, it is possible to expect a more satisfactory raw material for ironmaking.

In addition, it is possible to remove sulfur as SOX in hematite particles by roasting the hematite that is obtained by the present invention at a predetermined temperature and to lower the sulfur content thereof.

Specifically, it is possible to obtain hematite in which a sulfur concentration is 0.5% or less by performing a heat treatment at 600° C. or higher. In a heat treatment at a temperature higher than 1400° C., the sulfur concentration becomes 0.05% or less, and thus the sulfur concentration obtained becomes the same as in a conventional iron ore.

It is possible to obtain hematite with a low sulfur concentration through a heat treatment at a temperature higher than 1400° C. However, when the heat treatment temperature is set to be higher, energy consumption increases, and an operational lifespan of a furnace wall material is shortened, and thus a heat treatment at 1400° C. or lower is economically preferable.

EXAMPLES

Hereinafter, the present invention will be described in more detail with reference to Examples and Comparative Examples. The common producing conditions and characteristic measuring conditions in Examples and Comparative Examples are summarized in Table 1.

TABLE 1

| Items/Conditions | |
|---|---|
| Tailings slurry | Solid content: 35 [wt %]<br>Treatment speed: 400 [t/hr]<br>Component in solid content: Fe/35%, S/7%<br>Particle size: hematite (1 μm), gypsum (30 μm) |
| Wet cyclone | "Model Number SC224-P" manufactured by SOLDER CYCLON CORPORATION<br>Classification setting conditions: Particle Size for Overflow is determined by a setting between 1 μm or less and 2 μm or less |
| Magnetic separator | "High Gradient Magnetic separator; Model Number 120" manufactured by MESSO CORPORATION<br>Aperture of mesh for application of magnetic force: 50 [μm]<br>Magnetic field intensity: 12 [kGauss] |
| Particle-size measurement | Laser diffraction-type particle size distribution measuring apparatus "SALD-3100" manufactured by SHIMADZU CORPORATION<br>$d_{50}$ particle size: Value measured by laser diffraction method |

Example 1

The present invention was applied in separating a leach residue. As indicated in Table 1, the leach residue was first separated by the wet cyclone and the resultant overflow was subsequently separated by the magnetic separator.

With respect to an amount of the solid content to be treated, the leach residues of 10 tons were treated to obtain the overflow slurry weight of 9.1 tons.

After the magnetic separation, 2.2 tons of hematite having 53% iron grade and 0.7% sulfur grade was obtained.

Example 2

The present invention was applied in separating a leach residue. As indicated in Table 1, first, the leach residue was separated by the wet cyclone and the resultant overflow was subsequently separated by the magnetic separator.

With respect to an amount of the solid content to be treated, the leach residues of 10 tons were treated to obtain the overflow slurry weight of 9.1 tons.

Hematite cakes of 2.2 tons obtained through magnetic separation and dehydration was subjected to high-pressure filter pressing (with a high-pressure heating filtration apparatus), thereby obtaining hematite of 2.0 tons with 52% iron grade, 0.8% sulfur grade, and the moisture content of 15%.

Example 3

The present invention was applied in separating a leach residue. As indicated in Table 1, first, the leach residue was separated by the wet cyclone and the obtained overflow was subsequently separated by the magnetic separator.

With respect to an amount of the solid content to be treated, the leach residues of 10 tons were treated to obtain the overflow slurry weight of 9.1 tons.

Hematite cakes of 2.2 tons obtained through magnetic separation and dehydration was subjected to high-pressure filter pressing (with a high-pressure heating filtration apparatus), thereby obtaining hematite of 2.0 tons with 52% iron grade, 0.8% sulfur grade, and the moisture content of 15%.

This cake was subjected to a heating treatment at 1400° C., thereby obtaining a hematite granulated material having the moisture content of 0% and the sulfur concentration of 0.05%.

Example 4

A treatment was performed in the same manner as the treatment conditions of Example 1 except that the wet cyclone was adjusted to have a setting of 1 μm or less and a magnetic field intensity of the magnetic separator was 5 [kGauss].

The resultant overflow slurry was 8 tons.

After magnetic separation, hematite having 52% iron grade, 0.8% sulfur grade, and the solid content of 1.6 tons was obtained.

Example 5

A treatment was performed in the same manner as the treatment conditions of Example 1 except that the wet cyclone was adjusted to have a setting of 2 μm or less and the magnetic field intensity of the magnetic concentration machine was 20 [kGauss].

The resultant overflow slurry was 9.3 tons.

After magnetic separation, hematite having 55% iron grade, 0.9% sulfur grade, and the solid content weight of 2.3 tons was obtained.

Comparative Example 1

A treatment was performed in the same operations as in Example 1 except that the present invention was not applied and separation was not performed by the magnetic separator.

As a result, it was possible to obtain 7.9 tons of the solid content with 37% iron grade and 5% sulfur grade, but was not available as hematite for ironmaking by itself.

Comparative Example 2

A treatment was performed in the same operations as in Example 1 except that the present invention was not applied and separation was not performed by the wet cyclone.

As a result, the mesh to which the magnetic force was applied was clogged immediately after operation, and thus it was not possible to continue the operation.

Comparative Example 3

A treatment was performed in the same manner as the treatment conditions of Example 1 except that the wet cyclone was adjusted to have a setting of 0.4 µm or less and a magnetic field intensity of the magnetic separator was 4 [kGauss].

The resultant overflow slurry was 0.5 tons.

After magnetic separation, very small amount of low-grade hematite having 49% iron grade, 1.2% sulfur grade, and the solid content of 0.01 tons was obtained.

Comparative Example 4

A treatment was performed in the same manner as the treatment conditions of Example 1 except that the wet cyclone was adjusted to have a setting of 2.5 µm or less and a magnetic field intensity of the magnetic separator was 22 [kGauss].

The resultant overflow slurry was 9.3 tons.

After magnetic separation, a high-sulfur-containing hematite having 52% iron grade, 1.5% sulfur grade, and the solid content weight of 2.1 tons was obtained.

DRAWINGS

Figure 2:
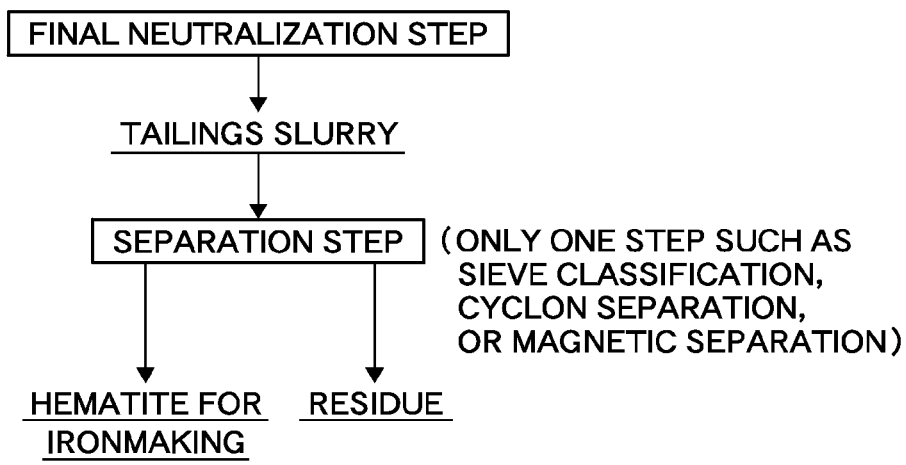
FIG. 2 is a flowchart of a conventional producing process of hematite for ironmaking from tailings slurry.

FIG. 1
1 FINAL NEUTRALIZATION STEP
2 TAILINGS SLURRY
3 SEPARATION STEP (WITH WET CYCLONE)
4 OVERFLOW
5 UNDERFLOW
6 SEPARATION STEP (WITH MAGNETIC SEPARATOR)
7 STRONG MAGNETIC SUBSTANCE (HEMATITE FOR IRONMAKING)
8 WEAK MAGNETIC SUBSTANCE
FIG. 2
1 FINAL NEUTRALIZATION STEP
2 TAILINGS SLURRY
3 SEPARATION STEP (ONLY ONE STEP SUCH AS SIEVE CLASSIFICATION, CYCLON SEPARATION, OR MAGNETIC SEPARATION)
4 HEMATITE FOR IRONMAKING
5 RESIDUE
FIG. 3
1 NICKEL OXIDE ORE
2 ORE PROCESSING STEP
3 ORE SLURRY
4 LEACHING STEP
5 LEACH SLURRY
6 SOLID-LIQUID SEPARATION STEP
7 LEACHATE
8 NEUTRALIZATION STEP
9 NEUTRALIZED PRECIPITATATE SLURRY
10 MOTHER LIQUOR (1)
11 ZINC REMOVAL STEP
12 ZINC SULFIDE PRECIPITATE
13 MOTHER LIQUOR (2)
14 SULFURIZATION STEP
15 MIXED SULFIDE
16 BARREN LIQUOR
17 LEACH RESIDUE SLURRY
18 FINAL NEUTRALIZATION STEP
19 FINAL NEUTRALIZED RESIDUE
20 TAILINGS DAM

The invention claimed is:

1. A method for producing hematite for ironmaking, utilizing a leach residue as a raw material, the leach residue being obtained from a hydrometallurgical refining plant where a nickel oxide ore treated by a high pressure acid leach process, the method comprising, in sequence:
   a first separation step of separating the leach residue into an overflow containing hematite and chromite and an underflow containing gypsum by using a wet cyclone under a condition that the wet cyclone is adjusted to have a setting between 1 µm or less and 2 µm or less as a classification particle size for the overflow; and then
   a second separation step of separating the hematite and the chromite contained in the overflow using magnetic force having a magnetic field intensity of 5 to 20 [kGauss] by a strong-magnetic-field magnetic separator having a mesh that applies magnetic force to powders when the powders pass through the mesh, thereby producing a hematite cake.

2. The method for producing hematite for ironmaking according to claim 1, further comprising a dehydration process of adjusting a moisture content of the hematite cake to be 10 wt % to 17 wt %.

3. A method for producing hematite for ironmaking, utilizing a leach residue, the leach residue having an iron grade of 30% to 35% and a sulfur grade of 3% to 10% as a raw material, the method comprising, in sequence:
   a first separation step of separating the leach residue into an overflow containing hematite and chromite and an underflow containing gypsum by using a wet cyclone under a condition that the wet cyclone is adjusted to have a setting between 1 µm or less and 2 µm or less as a classification particle size for the overflow; and then
   a second separation step of separating the hematite and the chromite contained in the separated overflow using magnetic force having a magnetic field intensity of 5 to 20 [kGauss] by a strong-magnetic-field magnetic separator having a mesh that applies magnetic force to powders when the powders pass through the mesh thereby producing a hematite cake.

4. The method for producing hematite for ironmaking according to claim 3, further comprising a dehydration process of adjusting a moisture content of the hematite cake to be 10 wt % to 17 wt %.

5. The method for producing hematite for ironmaking according to claim 3, further comprising granulating the hematite cake to form a granulated material.

6. The method for producing hematite for ironmaking according to claim 3, further comprising heating the hematite cake at a temperature of 600° C. or higher.

* * * * *